Oct. 11, 1949.   O. WITTEL   2,484,441
PARALLAX CORRECTION DEVICE FOR CAMERA VIEW FINDERS
Filed Jan. 7, 1948
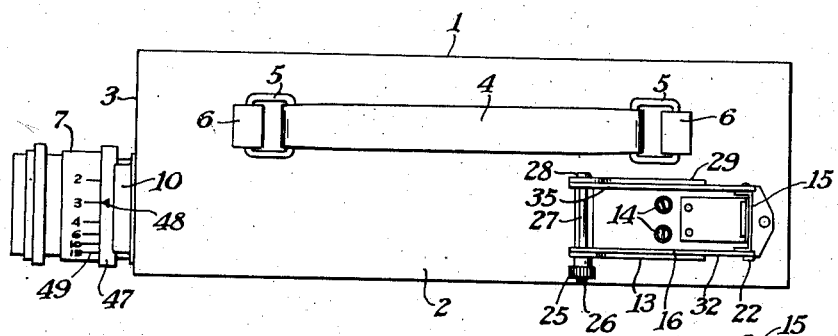
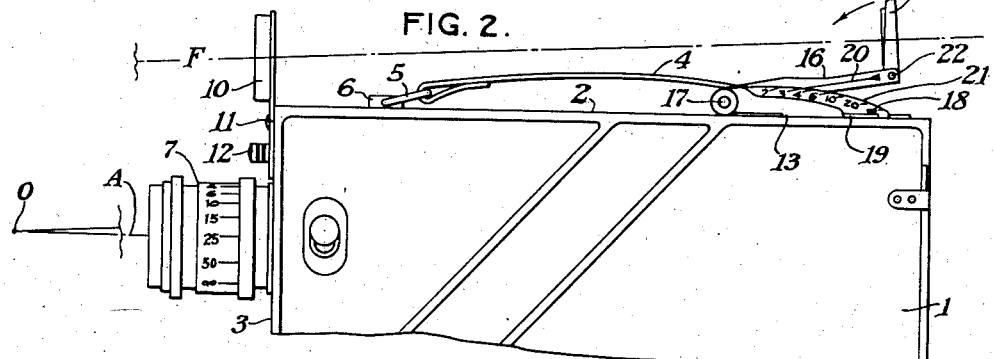
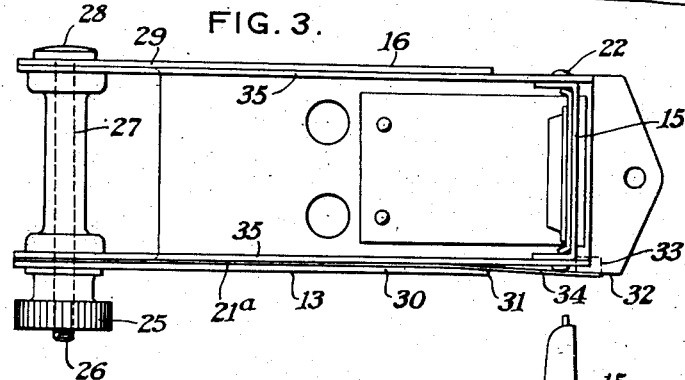
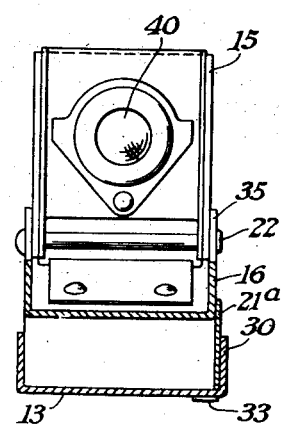
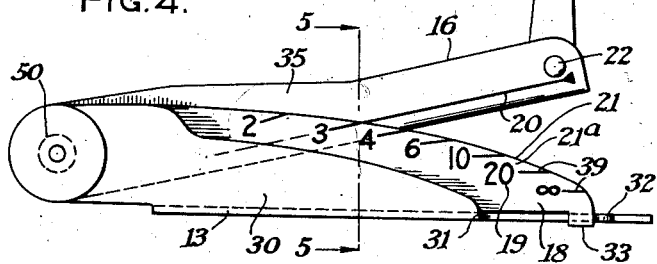
OTTO WITTEL
INVENTOR Patented Oct. 11, 1949

2,484,441

UNITED STATES PATENT OFFICE 2,484,441

PARALLAX CORRECTION DEVICE FOR CAMERA VIEW FINDERS

Otto Wittel, Rochester, N. Y., assignor to Eastman Kodak Company, Rochester, N. Y., a corporation of New Jersey Application January 7, 1948, Serial No. 932

2 Claims. (Cl. 33—64)

This invention relates to photography and more particulary to a parallax-correction device for camera view finders. One object of my invention is to provide a parallax-correction device which is adapted for use with objectives of different focal lengths. Another object of my invention is to provide a device of the class described with an adjusting scale and pointer having wide separation between the scale elements to facilitate reading and setting. Another object of my invention is to provide a support for a finder or finder element which is simple and inexpensive to construct which may be folded flat against the camera and which can be easily latched or held in any set position. Other objects will appear from the following specification, the novel features being particularly pointed out in the claims at the end thereof.

Parallax-correcting view finders have been made in various forms in the past but in most of these devices the parallax-correcting adjustments are only useful for a single focal length objective and they are usually rather difficult to operate as it is customary to provide parallax-adjusting scales and pointers so arranged that it is difficult to tell on exactly what distance the finder element is corrected for parallax, and it is frequently very difficult to read between the cross graduations which appear on the scale. My invention is directed to overcoming these and other difficulties and to improve parallax-correcting finders.

Coming now to the drawings wherein like reference characters denote like parts throughout:

Fig. 1 is a top plan view of a typical camera in which a parallax-correcting finder, constructed in accordance with and embodying a preferred form of my invention, may be mounted;

Fig. 2 is a fragmentary side elevation of the camera shown in Fig. 1;

Fig. 3 is an enlarged top plan view of a preferred form of finder element mount embodying my invention;

Fig. 4 is a side elevation of the finder element mount shown in Fig. 3; and

Fig. 5 is a section taken on line 5—5 of Fig. 4.

My invention consists in providing a hinged finder element mount in which the hinge is spaced a considerable distance from one of the finder elements so as to provide an elongated pair of elements which provide an elongated scale and an elongated pointer, both of which are very desirable to separate the scale graduations a sufficient distance to be easily read, to be easily set, and to provide a structure in which separable scales may be applied to the finder element support, one for each objective of a given focal length. A means is also provided for holding the parts in any set or adjusted position.

As a typical example of a finder constructed in accordance with my invention, I have illustrated one form as being applied to a motion-picture camera 1 having a top wall 2 and a front wall 3. The top wall 2 may support a handle 4 by means of the usual rings 5 from brackets 6 and the front wall 3 may support an objective 7. In such motion-picture equipment, it is customary to provide cameras of this type with a series of different objectives of different focal lengths so that in order to take care of different focal length objectives, the parallax-correcting finder must be provided with a means for compensating for the various focal distances with the various focal length lenses to be used. It is, of course, desirable to provide some means for doing this without materially adding to the cost of the camera, and it is preferable to provide some means which can accompany each objective sold for the camera which can be applied to the finder to care for the particular focal length objective.

As one way of accomplishing this, I have provided, in this instance, a pair of spaced finder elements, such as a front finder element 10 which may be carried by a supporting arm 11 movably mounted on a pin 12 carried by the front wall 3 of the camera in such a manner that this finder element may be folded against the front wall when not in use. It may consist of an open frame of the proportions of the picture, or it may include a lens.

In this form of my invention I provide an elongated element 13 which may be attached to the top wall 1 of the camera as by screws 14 and this element may constitute a base supporting a second finder element 15 by means of a second elongated member 16 hingedly attached to the first-mentioned elongated element 13, as indicated in the drawings. Both elements 13 and 16 are preferably made quite long so that one of these elements, here shown as 13, may carry an elongated scale 18 bearing well-spaced graduations 19 which cooperate with an elongated line or pointer 20 carried by the member 16. The upper wall 21 of the scale 18 is preferably curved as shown to better separate the graduations 19 and the pointer 20, of course, extends throughout the greater portion of the length of the element 16 to cover the entire scale, as best shown by broken lines in Fig. 4.

The finder element 15 is preferably hinged at 22 to the element 16 so that it may rotate in the direction shown by the arrow in Fig. 2 to fold flat against this element. The two elongated elements 16 and 13 may be held in any adjusted position by means of a nut 25 threaded to a screw 26 on the end of the hinge pintle 27 which has a head 28 engaging an upstanding flange 29 on element 13. The opposite upstanding flange 30 on element 13 is preferably cut off at 31 so as to form a notch 32 in element 13 which may receive a bent-over lug 33 carried by a thin metal scale plate 21. This scale plate, as best shown in Fig. 4, includes an aperture 50 which may slip over the hinge pintle 27 and the plate is so shaped that it will lie against the flange 30 with the lug 33 engaging the notch 32 in an upright or operative position between the flange 30 and flange 35 of the elongated member 16. Both flanges 35 of the elongated member 16 are similar in shape and a hinge pintle 22, as above described which supports the finder element 15, passes through these flanges. Thus, it is a simple matter, by unscrewing the nut 25, to push the hinge pintle 27 to a position which will permit the insertion of a scale plate 21a to suit the particular objective being used, and, since the objectives may be sold with a scale plate, since these are quite inexpensive, the correct scale plate can be applied to the camera for the selected objective.

It should be noticed that the axis of the objective "A" and the axis of the finder "F" will meet at an object point "O" when the scale graduation 19 and pointer 20 are properly adjusted. Thus, in Fig. 2, the finder is set for an object at four feet from the camera, and, in Fig. 4, the finder is set for an object three feet from the camera.

It should be noticed that the graduations 19, indicating various focal distances, are provided with large figures and the indexing lines 39 are spaced apart so that it is a comparatively simple operation to adjust the finder element 15 by loosening the nut 25, moving the hinged element 16 to the correct position and tightening the nut.

The finder element 15 may be an open frame of the proportions of the picture area, but I preferably provide a viewing lens 40, as best shown in Fig. 5. It is, however, not important to the invention what type the two finder elements are and whether or not one or both finder elements are carried by the elongated element 16, and its support 13. In cameras which are quite long, as in the motion-picture camera illustrated, it is usually desirable to space the front and rear finder elements as described above, and with such spacing, of course, considerable movement of the rear finder element is usually required. If the camera should be a roll-film camera, or other camera having only a narrow wall to support the finder, it is preferable to mount both the front and rear finder elements on the hinged arm 16 so that they may be swung together about the pivot 17. This makes a much more compact arrangement but the operation of the device is, of course, the same.

With a camera equipped with the embodiment of the invention shown in the drawings, an operator may focus the objective 7 by turning the knurled ring 47 until a pointer 48 indicates the focal distance on a scale 49. With many cameras this may be done utilizing a range finder, but regardless of how it is accomplished the operator, after selecting the focal distance (here shown as three feet), may move the elongated element 16 until the pointer 20 indicates the proper setting on the scale 19. Fig. 4 is approximately full size and this clearly shows the elongated scale and elongated pointer are of such size that the proper adjustment can easily be made. If desired, the nut can be tightened to merely afford enough friction to hold the parts in a set position so that the elongated element 16 is just swung up or down to the proper position without manipulating the nut 25 or, if desired, this nut can be tightened and loosened at each setting of the device.

It is customary with cameras of this type to select an objective 7 most suited to the work and when this is done the removable scale plate 21a may be applied to the elongated element 13 which constitutes a base for the finder element.

Having thus described my invention, what I desire to secure by Letters Patent of the United States and what I claim is:

1. In a view finder for cameras for correcting for parallax, a finder element support comprising an elongated element adapted to be attached to a camera including a hinge at one end, and adapted to constitute a base, a second elongated element attached to the hinge and extending over and of substantially the same length as the elongated element constituting the base, a finder element carried by the movable element on the end opposite to the hinge, the hinged elements carrying a scale on one element and a pointer on the other, both extending along substantially the length of the elongated elements and characterized in that the hinged element carrying the scale consists of a curved elongated flange member having a top edge curved and bearing scale indications throughout the greater part of its length, the scale indications being spaced both in a longitudinal direction and in a direction transversely thereof to provide maximum clearance between the scale indications and to facilitate adjustment of the hinged pointer and scale.

2. In a view finder for cameras for correcting for parallax, a finder element support comprising an elongated element adapted to be attached to a camera including a hinge at one end, and adapted to constitute a base, a second elongated element attached to the hinge and extending over and of substantially the same length as the elongated element constituting the base, a finder element carried by the movable element on the end opposite to the hinge, the hinged elements carrying a scale on one element and a pointer on the other element, both extending along substantially the length of the elongated element and means for retaining the elements in a selected set position to correct for parallax at a distance indicated by the scale and pointer characterized in that the hinged element carrying the scale includes means for removably supporting a separable scale plate consisting of a notch, said separate scale plate having an aperture in one end and a formed-over lug on the other end, the aperture of the scale plate being engageable with the hinge and the formed-over lug being engageable with a notch in the hinged element, and a flange carried by the hinged element against which the separate scale plate may lie in an operative position.

OTTO WITTEL.

REFERENCES CITED

The following references are of record in the file of this patent:

UNITED STATES PATENTS

| Number | Name | Date |
|---|---|---|
| 970,443 | Hammond | Sept. 13, 1910 |
| 1,646,829 | Mitchell | Oct. 25, 1927 |